United States Patent [19]

Johnson

[11] Patent Number: 5,416,160

[45] Date of Patent: May 16, 1995

[54] WATER-SWELLABLE POLYMERS HAVING IMPROVED COLOR

[75] Inventor: Thomas C. Johnson, Midland, Mich.

[73] Assignee: The Dow Chemical Company, Midland, Mich.

[21] Appl. No.: 135,034

[22] Filed: Oct. 12, 1993

Related U.S. Application Data

[63] Continuation-in-part of Ser. No. 901,344, Jun. 19, 1992, abandoned.

[51] Int. Cl.$^6$ .................... C08L 29/04; C08L 33/02
[52] U.S. Cl. ........................... 525/59; 525/244; 525/301
[58] Field of Search ............ 525/59, 244, 301; 524/459

[56] References Cited

U.S. PATENT DOCUMENTS

| | | | |
|---|---|---|---|
| 4,076,663 | 2/1978 | Masuda et al. | 260/17.4 |
| 4,320,040 | 3/1982 | Fujita et al. | 524/459 |
| 4,826,917 | 5/1989 | Kondo et al. | 525/59 |
| 4,833,222 | 5/1989 | Siddall et al. | 526/200 |

FOREIGN PATENT DOCUMENTS 56-125419 10/1981 Japan.

*Primary Examiner*—W. Robinson Clark

[57] ABSTRACT

The subject invention pertains to a water-swellable polymer comprising the polymerization product of an $\alpha,\beta$-ethylenically unsaturated monomer in an aqueous phase, initiator, crosslinking agent, and polyvinyl alcohol, the polymerization product having been heated at a temperature greater than about 160° C., wherein the polyvinyl alcohol is less than about 98 percent hydrolyzed, such that the polymerization product has improved whiteness.

9 Claims, No Drawings

WATER-SWELLABLE POLYMERS HAVING IMPROVED COLOR

This application is a continuation-in-part of U.S. patent application Ser. No. 07/901,344, filed on Jun. 19, 1992, now abandoned.

FIELD OF INVENTION

The subject invention pertains to a water-swellable polymer. In particular, the subject invention pertains to a water-swellable polymer having improved color properties.

BACKGROUND OF THE INVENTION

Water-swellable polymers are used as constituents in personal care materials which absorb bodily fluids such as disposable baby diapers, sanitary napkins, and incontinent devices. U.S. Pat. Nos. 3,926,891, 4,190,562, and 4,293,609, the relevant portions incorporated herein by reference, provides examples of such polymers.

Various processes are known for producing water-swellable polymers. For example, U.S. Pat. No. 4,833,222, the relevant portions of which are incorporated herein by reference, teaches a process for preparing an absorbent polymer from a neutralized monomer in the absence of a surface active agent. U.S. patent application Ser. No. 756,731 discloses a process for preparing a water-swellable polymer having improved absorptive properties, the relevant portions of which are incorporated herein by reference.

U.S. Pat. No. Re. 32,649, discloses a process for producing absorbent polymers comprising preparing a reaction mixture consisting essentially of particular amounts of polymerizable acid group-containing monomers, crosslinking agents, and free radical initiator, in an aqueous medium, and thereafter polymerizing and neutralizing at least a portion of the acid functional groups.

Absorbent polymers used in personal care devices must absorb liquid under a variety of pressures. For instance, the polymer in a disposable baby diaper will preferably absorb freely when the baby is standing, but must likewise absorb under pressure when the baby is sitting. Properties such as absorbency under load and capacity reflect the absorptive properties of the polymer.

In addition to preferred absorptive properties, the water-swellable polymer will preferably not detract from the aesthetic design of the personal care device in which it is incorporated. In particular, water-swellable polymers which are white rather than yellowed, have greater commercial appeal.

Water-swellable polymers may incorporate polyvinyl alcohols. However, it has been found, that certain types of polyvinyl alcohols impart a yellow tone to the water-swellable polymers in which they are incorporated.

Those in the industry would find great advantage in a water-swellable polymer containing polyvinyl alcohols which is suitably white, rendering such water-swellable polymers especially preferred in personal care articles.

SUMMARY OF THE INVENTION

The subject invention provides a water-swellable polymer comprising the polymerization product of an $\alpha,\beta$-ethylenically unsaturated monomer in an aqueous phase, initiator, crosslinking agent, and polyvinyl alcohol, the polymerization product having been heated at a temperature greater than about 160° C., wherein the polyvinyl alcohol is less than about 98 percent hydrolyzed.

DETAILED DESCRIPTION OF THE INVENTION

The water-swellable polymers in accordance with the present invention are prepared from water-soluble $\alpha,\beta$-ethylenically unsaturated monomers. Suitable $\alpha,\beta$-ethylenically unsaturated monomers include, e.g., acrylic acid, methacrylic acid, crotonic acid, isocrotonic acid, maleic acid, fumaric acid, itaconic acid, or any of the salts thereof. Other $\alpha,\beta$-ethylenically unsaturated monomers include acrylamide, methacrylamide, and 2-acrylamido-2-methyl-1-propane based sulfonic acid and its salts. Preferred monomers include acrylic acid and methacrylic acids and their respective salts, such as alkali metal or ammonium salts.

The water-soluble monomers useful in the present invention may be used in an amount ranging from about 10 percent to about 80 percent by weight based on the total weight of the aqueous monomer solution. Preferably, the water-soluble monomers will be provided in an amount between about 20 percent and about 60 percent, based on the total weight of the aqueous monomer solution.

In addition, polyvinyl alcohol will be employed as a component of the aqueous monomer solution in an amount up to about 10 weight percent based on the weight of the $\alpha,\beta$-ethylenically unsaturated monomer. Preferably, the polyvinyl alcohol will be provided in an amount from about 0.5 to about 10 weight percent based on the weight of the $\alpha,\beta$-ethylenically unsaturated monomer. More preferably, the polyvinyl alcohol will be provided in an amount greater than 1 and less than 5 weight percent, based on the weight of the $\alpha,\beta$-ethylenically unsaturated monomer. Most preferably, the polyvinyl alcohol will be provided in an amount greater than 1.5 and less than 4 weight percent, based on the weight of the $\alpha,\beta$-ethylenically unsaturated monomer.

The aqueous monomer solution may include a chelating agent to remove trace metals from solution, which form, e.g., when a metal reaction vessel is employed. One such chelating agent is VERSENEX 80 chelating agent (Trademark of The Dow Chemical Company for an aqueous solution of the pentasodium salt of diethylene triamine pentacetic acid). Such chelating agents, when employed, are generally provided in amounts between about 100 and about 2,000 parts per million, based on the weight of the $\alpha,\beta$-ethylenically unsaturated monomer.

In general, it is desirable to obtain a level of conversion of monomer to polymer of at least about 95 percent. The polymerization may be carried out using acid monomers that are not neutralized or that have been neutralized or partially neutralized prior to the polymerization. Neutralization is conveniently achieved by contacting the aqueous monomer in an amount of basic materials sufficient to neutralize between about 20 and about 95 percent of the acid groups present in the acid monomers. Preferably, the amount of basic materials will be sufficient to neutralize between about 40 and about 85 percent, and most preferably between about 55 and about 75 percent of the acid groups present in the acid monomers. When pre-neutralizing the monomer solution, it is important to control the neutralization so that the heat of neutralization does not cause the premature polymerization of the monomer mixture. The neutralization is advantageously carried out at temperatures below 40° C. preferably at temperatures below 35° C.

The neutralization is conveniently achieved by contacting the aqueous monomer with an amount of basic material sufficient to neutralize the acid groups to the desired degree. Suitable basic materials include, e.g., alkali metal or ammonium hydroxides, alkali metal or ammonium carbonates, and alkali metal or ammonium bicarbonates. Largely for economic reasons, sodium hydroxide and sodium carbonate are preferred. In determining the desired degree of neutralization, care must be taken to insure that the pH of the resulting crosslinked absorbent polymer, which will be contacted with or dispersed in an aqueous fluid to be absorbed, is maintained in a range appropriate for the application for which the polymer is intended. Alternatively, the polymerization may be carried out by employing unneutralized monomers and thereafter neutralizing, as is known in the art.

Conveniently, a vinyl addition polymerization initiator is used in the polymerization of the water-soluble monomers and the crosslinking agent. A free radical initiator which is sufficiently soluble in the monomer solution to initiate polymerization is preferred. For example, water-soluble persulfates such as potassium persulfate, ammonium persulfate, sodium persulfate, and other alkali metal persulfates, hydrogen peroxide and other water-soluble peroxides, and water-soluble azo-compounds such as 2,2'-azobis(2-amidinopropane.HCl) may be employed. The initiator may be combined with a reducing agent and used as a redox-type initiator. The reducing agents suitable for this combined use include sulfites, amines, thiosulfates, erythorbates, and ascorbates. See, e.g., U.S. Pat. No. 4,861,849 and U.S. patent application Ser. No., filed on Jun. 5, 1992 on behalf of Frederic L. Buchholz et al. and corresponding to attorney docket number C-37630B, the relevant portions of which are incorporated herein by reference. The total amount of initiators present may range from about 0.01 to about 1.0 weight percent, preferably from about 0.01 to about 0.5 weight percent, based on the total weight of the $\alpha,\beta$-ethylenically unsaturated monomer.

Organic compounds having two or more ethylenic groups copolymerizable with the water-soluble monomers can be used as the crosslinking monomer. Suitable crosslinking agents are well known in the art. Examples include trimethylolpropane triacrylate, diethylene glycol diacrylate, methylene bisacrylamide, bis(acrylamido)acetic acid and its salts, allyl acrylate, allyl methacrylate, and difunctional monovinyl and monoallyl esters and amides. The crosslinking agent is present in an amount effective to crosslink the water-soluble polymer. The preferred amount of crosslinking agent is determined by the desired degree of capacity and the desired strength to retain the absorbed fluid. Typically, the crosslinking agent is used in amounts ranging from about 0,005 to about 5 parts by weight per 100 parts by weight of the $\alpha,\beta$-ethylenically unsaturated monomer. More preferably, the crosslinking agent is provided in an amount between about 0.1 and about 1 part by weight per 100 parts by weight of the $\alpha,\beta$-ethylenically unsaturated monomer. If an amount over 5 parts by weight of crosslinking agent per 100 parts of the $\alpha,\beta$-ethylenically unsaturated monomer is used, the resulting polymer will tend to have too high a crosslinking density and will tend to exhibit a reduced capacity. If the crosslinking agent is used in an amount less than about 0.0005 part by weight per 100 parts of the $\alpha,\beta$-ethylenically unsaturated monomer, the polymer will tend to have too low a crosslinking density, and when contacted with the fluid to be absorbed, will tend to become sticky and will tend to exhibit a lower initial absorption rate.

The polymerization of the mixture may be initiated by elevating the temperature of the mixture containing the initiator or by using a redox-type initiator as described above. Generally, the temperature at which polymerization will begin ranges from about 20° C. to about 45° C. The temperature at which the polymerization is carried out depends on the type of monomers used and the specific initiator system employed. Preferably, the maximum temperature of the polymerization ranges from about 50° C. to about 100° C., more preferably from about 50° C. to about 90° C. The method by which the temperature of the polymerization is controlled is not critical, provided sufficient cooling is present to remove the heat generated during the polymerization.

Following polymerization, the resultant polymer gel is partially dried in, e.g., a through-circulation band dryer to a moisture content of less than 10 percent, preferably less than 5 weight percent, expressed on a dry polymer basis.

Through drying and/or through a subsequent heat treatment step, the polymer is elevated to a temperature greater than about 160° C., in particular to a temperature between about 160° C. and about 230° C. For instance, in the case of an allyl methacrylate crosslinked polymer, the dried polymer is subsequently heat-treated at a temperature between about 170° C. and about 230° C. more preferably between about 190° C. and about 210° C., or a time between about 3 and 15 minutes, more preferably between about 5 and about 30 minutes. Drying equipment and processes are well known in the art. For heat treatment, forced air ovens, fluidized bed heaters, heated through conveyors, and the like may be employed. If desired, the heat-treated polymer may be remoisturized for ease in handling.

Polyvinyl alcohol is typically prepared by the hydrolysis of polyvinylacetate. Typical commercial grades of polyvinyl alcohol are characterized by particular degrees of hydrolysis and particular molecular weights. For instance, according to current manufacturers specifications, AIRVOL 107 polyvinyl alcohol (available from Air Products and Chemicals, Inc.) is about 98.5 percent hydrolyzed and is characterized as having a low molecular weight. According to current manufacturers specifications, AIRVOL WS-42 polyvinyl alcohol is about 97 percent hydrolyzed. Likewise, according to current manufacturers specifications, AIRVOL 205, 523, and 540 polyvinyl alcohols are characterized as having low, medium, and high molecular weights respectively, while each being about 88 percent hydrolyzed.

It has been found that the degree of hydrolysis of the polyvinyl alcohol utilized in the monomer solution affects the color of the resultant polyvinyl alcohol grafted polymer product which has been exposed to elevated temperatures. In particular, higher degrees of hydrolysis lead to greater yellowing of the final polymer product which has been exposed to such temperatures. Preferably, the polyvinyl alcohol utilized will be less than about 98 percent hydrolyzed, more preferably less than about 90 percent hydrolyzed.

The following examples are provided for the purpose of explanation rather than limitation.

EXAMPLE 1

The polymerizations were carried out in a sealed jacketed, two-liter reactor, having a glass bottom and a stainless steel top and having a high torque agitator assembly.

A solution of 13.5 grams polyvinyl alcohol in 150 grams water was added to the reactor. Subsequently, a solution of 270 grams acrylic acid, 1.35 grams allyl methacrylate crosslinking agent, 0.36 grams VERSENEX 80 chelating agent (Trademark of The Dow Chemical Company), in 101.9 grams water was added. Agitation was maintained to prevent precipitation of the polyvinyl alcohol. A solution of 124.2 grams sodium carbonate in 404.8 grams water was prepared. The temperature of the reactor was adjusted to 30° C. While maintaining a slight nitrogen pressure, 4.59 mL of a 10 percent aqueous solution of sodium persulfate, 0.63 mL of a 30 percent aqueous solution of hydrogen peroxide, and 0.405 mL of a 10 percent aqueous solution of sodium erythorbate were added.

An exothermic polymerization was observed to begin approximately 2 minutes after the erythorbate addition. The reaction peaked at about 80° C. The reactor was then cooled and maintained at 65° C.

The resultant gel product was dried in a forced air oven overnight at a temperature of 100° C. The dried product was ground to a suitable particle size, and was heat treated at a temperature of 200° C. for about 1 hour.

Table A sets forth data pertaining to the absorptive properties and color properties of two polyacrylate polymers, each prepared with a polyvinyl alcohol having a different degree of hydrolysis.

TABLE A

| Polyvinyl alcohol | Centrifuge capacity (g/g) | 0.3 psi AUL (g/g) | Hunter L | color b |
|---|---|---|---|---|
| AIRVOL 107 | 26.2 | 29.8 | 86.9 | 19.0 |
| AIRVOL 205 | 26.7 | 27.0 | 89.4 | 13.5 |

Centrifuge capacity was measured as follows. A 2.5×3 inch tea bag was formed from standard heat sealable tea bag material. A quantity of the polymer to be tested (0.18 to 0.20 grams) was added to the bag and the final side was heat sealed. The weight of the empty bag and the full bag were recorded as W1 and W2, respectively. The tea bags containing the polymer were allowed to swell in a 0.9 weight percent aqueous solution for about 30 minutes. The bags were then removed from the solution and were placed in a perforated centrifuge basket of having a diameter of 8 inches. The basket was quickly accelerated to 1500 rpm and was maintained at that speed for three minutes. The centrifuge was then turned off and the tea bags were reweighed to give a weight W3. The procedure was repeated with empty bags to obtain blank weights W1b and W3b. The centrifuged capacity was calculated in accordance with the following formula:

Centrifuge capacity
$(g/g) = (W3 - W2 + W1 - (W3b - W1b))/(W2 - W1)$.

0.3 psi AUL was measured in accordance with the procedures set forth in EP-443,627-A2, the relevant portions of which are incorporated herein by reference.

Hunter color was measured using a COLORQUEST Spectrocolorimeter (available from Hunter Associates Laboratory, Inc. (Reston, Va.)), using the analytical methods specified by the manufacturer. The "L" measurement relates to the lightness of the polymer. The "b" measurement relates to the yellow to blue color dimension. Higher "L" values correspond to lighter color; higher "b" values correspond to greater yellowness. Preferably, the resultant polymer will be characterized by a Hunter color "b" value of less than about 18, most preferably less than about 15. In addition, the resultant polymer will preferably be characterized by a Hunter color "L" value of at least 88, most preferably at least 89.

Colorimetric determinations may likewise be made in accordance with other known analytical techniques, e.g., yellowness index (ASTM D-1925 ), whiteness index (ASTM E-313 ), etc.

EXAMPLE 2

The polymerization of Example 2 was repeated utilizing AIRVOL WS-42 polyvinyl alcohol. The resultant polymer exhibited a whiter color than the polymer prepared with AIRVOL 107 polyvinyl alcohol.

One skilled in the art will find readily apparent any modifications not explicitly mentioned but within the scope of the subject invention. Accordingly, the subject invention shall be limited in scope only by the following claims.

What is claimed is:

1. A water-swellable polymer comprising the polymerization product of an $\alpha,\beta$-ethylenically unsaturated monomer in an aqueous phase, initiator, crosslinking agent, and polyvinyl alcohol, the polymerization product having been heated at a temperature of at least about 200° C. wherein the polyvinyl alcohol is provided in an amount greater than 1 and less than 5 weight percent based on the weight of the $\alpha,\beta$-ethylenically unsaturated monomer, wherein the polyvinyl alcohol is less than about 98 percent hydrolyzed, and wherein the polymer is characterized by a Hunter color "b" value of less than about 18.

2. The water-swellable polymer of claim 1, wherein the polyvinyl alcohol is provided in an amount between about 1 and about 5 weight percent based on the weight of the polymerization product.

3. The water-swellable polymer of claim 1, wherein the $\alpha,\beta$-ethylenically unsaturated monomer is acrylic acid, methacrylic acid, or salt thereof.

4. The water-swellable polymer of claim 1, wherein the temperature is greater than about 200° C.

5. The water-swellable polymer of claim 1, wherein the polyvinyl alcohol is less than about 90 percent hydrolyzed.

6. The water-swellable polymer of claim 5, wherein the polyvinyl alcohol is provided in an amount between about 1 and about 5 weight percent based on the weight of the polymerization product.

7. The water-swellable polymer of claim 5, wherein the $\alpha,\beta$-ethylenically unsaturated monomer is acrylic acid, methacrylic acid, or a salt thereof.

8. The water-swellable polymer of claim 4, wherein the temperature is greater than about 200° C.

9. The water-swellable polymer of claim 1, wherein the polymer is characterized by a hunter color "b" value of less than about 14.

* * * * *